March 16, 1948.    D. JONES    2,437,822
COMBINED DRILL AND DEBURRING TOOL
Filed Oct. 30, 1944
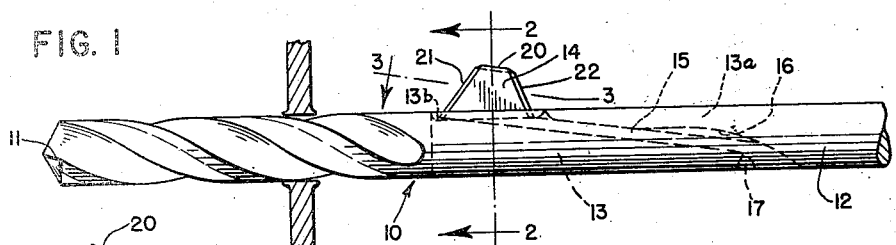
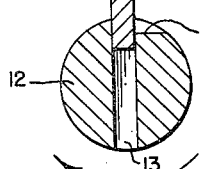
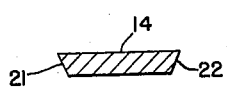
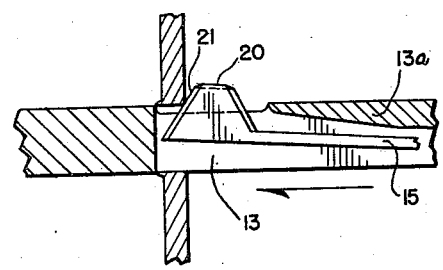
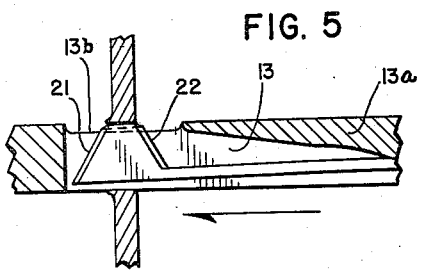
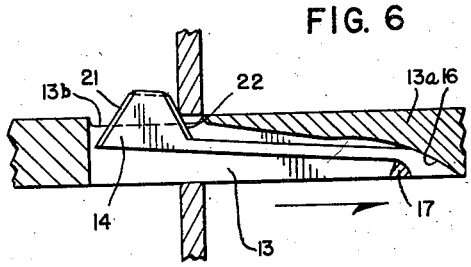
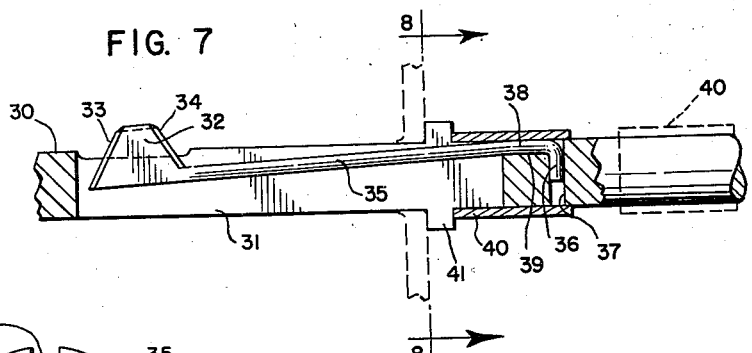
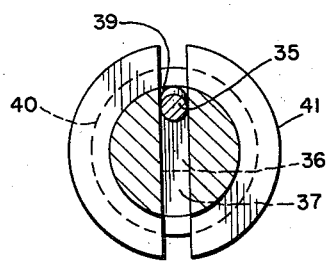
INVENTOR
DEDGER JONES
BY George F. Goodyear
ATTORNEY Patented Mar. 16, 1948

2,437,822

UNITED STATES PATENT OFFICE 2,437,822

COMBINED DRILL AND DEBURRING TOOL

Dedger Jones, Columbus, Ohio, assignor to Curtiss-Wright Corporation, a corporation of Delaware Application October 30, 1944, Serial No. 560,938

5 Claims. (Cl. 77—66)

This invention pertains to hand or machine operated tools and particularly to a novel deburring tool.

One of the principal objects of the present invention is found in the improvement which consists in combining with a rotary cutting tool, such as an ordinary drill bit, a supplementary cutting blade which is effective for removing the sharp burrs raised by the drill bit when the latter enters the work; or when drilling a through hole or aperture, is effective for removing the burrs formed at the hole margins on the face and back sides of the work.

It is also an important object that the supplementary or deburring cutting blade perform its intended function efficiently, entirely automatically and in the course of the drilling operation.

Still another advantage assignable to this invention resides in the form and mounting of the deburring blade whereby it may pass through the aperture or drilled hole, and in so doing remove the burrs formed during the drilling operation without in any way affecting the walls or bore of the drilled aperture.

Other objects and advantages of this invention will be pointed out in the following description.

The invention is illustrated in the accompanying drawings, in which:

Figure 1 is a general assembly view of the improved drill and deburring attachment, Figure 2 is a transverse sectional detail at line 2—2 of Figure 1, Figure 3 is a detail section of the deburring blade taken at line 3—3 of Figure 1, Figure 4 is a fragmentary sectional view of the tool in operation wherein the drill has passed through the work and the deburring blade has removed the burrs on the face side of the drilled aperture, Figure 5 is a view similar to Figure 4 but with the drill advanced farther into the work to show the deburring blade retracted sufficiently to pass through the bore of the aperture, Figure 6 is a still more advanced view of the drill and deburring tool than that of Figure 5 showing its action for removing the burrs at the rear marginal surface of the work, and Figures 7 and 8 are details of a modified form of the present invention, Figure 8 being a transverse section at line 8—8 of Figure 7.

The first form of this invention comprises a standard type of twist drill or drill bit 10 having spiral or fluted cutting edges 11 formed at one end and also a shank portion 12. The bit is adapted to be rotated by a power head not shown.

The drill shank immediately to the rear of the fluted portion is formed with a central longitudinal slot-like recess 13 which is fully open at the lower side but has a limited opening at the upper side which is sufficient to permit the outward projection of a cutting or deburring blade element 14. The deburring blade element 14 is movably positioned and retained in this slot upon a resilient arm 15, the base of the resilient arm being welded or otherwise securely anchored on the end wall 16 of the slot, as at 17. Thus the blade member 14 can be depressed or moved radially inwardly of the slot 13 so that no portion thereof projects beyond the cylindrical surface of the shank 12. On the other hand the blade 14 is definitely limited in its effective outward movement by the arm 15 contacting the portion 13a of the recess 13.

The deburring blade element 14 is in the general form of a trapezium, the longer one of the parallel sides constituting the base. The edge face of the shorter parallel side 20 is slightly beveled (Figure 2) for a purpose appearing later. The non-parallel sides 21 and 22 of this blade element converge toward side 20 so that upon contact with the work being drilled the blade inclination will tend to depress or cam the element 14 into the slot 13 against the resistance of the resilient arm 15. Each of the sides 21 and 22 is suitably beveled (Figure 3) and constitutes a somewhat dulled cutting edge for limiting the depth of cut when the blade is in proper position for removing the sharp projections or burrs raised by the drill. A land 13b on the lip margin of the blade slot is provided for chip relief (Figure 2) as is will understood.

Referring to Figures 4, 5 and 6 for an understanding of the operation of this deburring tool, it will be observed in Figure 4 that as the drill 10 is advanced through the work aperture, in the direction of the arrow, the deburring edge 21 of the element 14 contacts the facing margin of the aperture or bore formed by the drill and due to its edged character will cut into and remove the burrs, thus producing a finished and smooth face or marginal zone. As the drill bit advances into the work piece the inclined cutting edge 21 will cause the blade 14 to be biased or cammed radially inwardly until the side 20 clears the bore of the drilled aperture. The resilient character of arm 15 obviously will cause the blade surface 20 to rub on the side wall of this aperture but no damage will occur since the bevel face thereof will cause the blade to glide over the side wall without cutting. A study of Figure 2 will make this obvious, since the direction of rotation of the drill bit (see the arrow) is such as to present the beveled face to the wall of the bore.

Still further progress of the drill into and through the work will eventually carry the deburring blade element 14 sufficiently forward to allow it to spring outwardly on the opposite side as in Figure 6 whereupon the trailing inclined cutting edge 22 will be in position upon retraction or withdrawal of the bit to cut into and remove the burrs and sharp projections on the under side of the work. However, the outward force exerted by the resilient arm 15 upon the blade element 14 is just sufficient to clear the marginal portions of the aperture of all sharp edges, burrs, and the like which form during the drill operation. In no case must the biasing force of resilient arm 15 press the blade 14 against the work to cause either of the cutting edges 21 or 22 to enter the parent material. The angle of inclination of each of the cutting edges 21 and 22 must also be chosen so that excessive cutting will not occur.

Another and equally useful form of the present invention has been illustrated in Figures 7 and 8. Here the drill bit 30 is provided with a central longitudinal slot 31 to receive a deburring blade element 32 on which cutting edges 33 and 34 are formed. This blade element is identical with the previously described blade 14. However, in this modified arrangement the blade element 32 is carried on or is integrally formed with a resilient arm 35 which is detachably carried in the drill body as by positioning a lateral or inturned projection 36 formed at the base of this arm in a transverse aperture 37 in the drill shank. The arm portion 38 adjacent the lateral projection or bent part 36 is positioned in a channel 39, whereupon a collar 40 may be slid over the base of arm 35 to lock the same in place. Collar 40 is illustrated in retracted position in dotted outline and in its locking position in full line in Figure 7. When moved into locking position the collar abuts a projecting annular flange 41 integrally formed with the drill shank. Further, this flange acts as a stop member to limit the inward penetration of the drill as will be clearly understood.

The resilient arm 35 is characteristically similar to arm 15 and functions in a like manner to bias the cutting or deburring blade into its operative position as has been pointed out in connection with the previously described embodiment of this invention shown in Figure 1. Moreover, the deburring blade elements have cutting edges which, because of their outwardly converging, angular or inclined relation, are effective to remove burrs from the face and reverse sides of the aperture and at the same time act as camming means whereby the blade may be completely retracted or moved into the slot in order to permit passage thereof through the bore of the drilled opening. The double acting nature of this deburring blade is also of great advantage in a tool of the present type.

Due to the rotary nature of the twist drill or bit 10 it is also necessary to prevent excessive outward movement of the blade element as by centrifugal force developed during use of the tool. The arm member 35, even though resilient or flexible to permit blade movement inwardly of the slot, is also made sufficiently rigid or stiff to preclude undesirable and excessive outward movement thereof.

What is claimed is:

1. A tool for removing burrs from the face and reverse margins of a drilled bore comprising a body having a slot formed therein, a burr removing blade element positioned in said slot, and means for supporting and biasing said blade element including an arm member secured at one end in said slot and carrying said blade at its opposite end for swinging movement from a position projecting from the slot for effective contact with the bore margins to a retracted position within the slot to permit passage of the blade through the bore, said means biasing the blade element to said projecting position, said blade element having opposed and oppositely inclined cutting edges, one cutting edge being effective upon advancement of the tool into the bore to remove burrs on the face margin while simultaneously forcing said blade to swing to retracted position for allowing the blade to pass through the bore, and the opposed cutting edge being effective upon withdrawal of the tool from the bore to remove burrs on the reverse margin while simultaneously forcing said blade to swing to retracted position for allowing return passage of the blade through the bore.

2. A tool for removing burrs from the face and reverse margins of a drilled bore comprising a body having a slot formed therein which opens through the body, a burr removing blade element positioned in said open slot, and a resilient arm member secured at one end in said slot and carrying said blade at its opposite end for swinging movement from a position projecting from the slot for effective contact with the bore margins to a retracted position within the slot to permit passage of the blade through the bore, said resilient arm member biasing the blade to said projecting position, said blade element having opposed and oppositely inclined cutting edges, one cutting edge being effective upon advancement of the tool into the bore to remove burrs on the face margin while simultaneously forcing said blade to swing to retracted position to enable passage of the blade through the bore, and the opposed cutting edge being effective upon withdrawal of the tool from the bore to remove burrs on the reverse margin while simultaneously forcing said blade to swing to retracted position for return passage through the bore.

3. In a tool for removing burrs from the face and reverse margins of a drilled bore, a cylindrical body having an elongated slot formed therein, one end portion of said slot opening through said body, a blade element positioned in said open slot portion, and a resilient blade supporting arm secured at one of its ends in said slot near the end thereof opposite said open slot portion to provide a radius arm for permitting blade movement from a position normally projecting outwardly of said open slot portion to a temporary position retracted within said open slot portion to permit passage of the blade through the bore, said resilient arm biasing the blade to said projecting position, said blade element having opposed and oppositely inclined cutting edges, one cutting edge being effective upon advancement of the tool into the bore to remove burrs on the face margin while simultaneously forcing said blade to swing to retracted position to enable passage of the blade through the bore, and the opposed cutting edge being effective upon withdrawal of the tool from the bore to remove burrs on the reverse margin while simultaneously forcing said blade to swing to retracted position for return passage through the bore.

4. A deburring tool comprising a body adapted to be rotated and moved axially within a bore in a workpiece, said body having a recess a resilient arm affixed at one end thereof to the body, a blade mounted on the opposite end of said arm, the blade being supported by the arm to normally project beyond the confines of said body and being movable to a retracted position in the body recess upon flexure of the arm, the blade having oppositely inclined edge portions for effecting movement of the blade to such retracted position by cam action with the workpiece during axial movement of the body to pass the blade through the bore in either direction.

5. A deburring tool comprising a body provided with a recess and adapted to be rotated and moved axially within a bore in a workpiece, a blade having a resilient arm integral therewith and at the end thereof opposite to the blade being affixed to the body, the arm engaging said body and supporting the blade upon the body to normally project radially beyond the confines of the body and to retract within the body recess upon flexure of the arm, the blade having oppositely inclined edge portions for effecting movement of the blade to such retracted position by cam action with the workpiece during axial movement of the body to pass the blade through the bore in either direction.

DEDGER JONES.

REFERENCES CITED

The following references are of record in the file of this patent:

UNITED STATES PATENTS

| Number | Name | Date |
|---|---|---|
| 730,670 | Luckhurst | June 9, 1903 |
| 1,711,012 | Brandt | Apr. 30, 1929 |
| 2,314,084 | Fried | Mar. 16, 1943 |
| 2,364,293 | Hotchner | Dec. 5, 1944 |
| 2,373,474 | Heyer | Apr. 10, 1945 |
| 2,394,612 | Horne, Jr. | Feb. 12, 1946 |